(12) United States Patent
Kim et al.

(10) Patent No.: US 7,847,453 B2
(45) Date of Patent: Dec. 7, 2010

(54) BEARINGLESS STEP MOTOR

(75) Inventors: Seung Jong Kim, Seoul (KR); Du Jin Bach, Seoul (KR); Hosung Kong, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 330 days.

(21) Appl. No.: 11/915,082

(22) PCT Filed: May 3, 2006

(86) PCT No.: PCT/KR2006/001660

§ 371 (c)(1),
(2), (4) Date: Nov. 20, 2007

(87) PCT Pub. No.: WO2006/126788

PCT Pub. Date: Nov. 30, 2006

(65) Prior Publication Data

US 2008/0211354 A1    Sep. 4, 2008

(30) Foreign Application Priority Data

May 24, 2005  (KR) ...................... 10-2005-0043454

(51) Int. Cl.
*H02K 37/10* (2006.01)
(52) U.S. Cl. ................ 310/90.5; 310/49.46; 310/49.48; 310/49.36; 310/49.12; 310/181; 318/607; 361/144

(58) Field of Classification Search ............. 310/49.46, 310/49.48, 49.36, 49.12, 181, 90.5; 361/144; 318/607; *H02K 37/10*
See application file for complete search history.

(56) References Cited

U.S. PATENT DOCUMENTS 4,315,171 A    2/1982    Schaeffer
(Continued)

FOREIGN PATENT DOCUMENTS

JP    07123634 A    5/1995
(Continued)

*Primary Examiner*—Quyen Leung
*Assistant Examiner*—Terrance Kenerly
(74) *Attorney, Agent, or Firm*—Jones Day

(57) ABSTRACT

There is provided a bearingless step motor in which a rotating shaft can rotate while rising from a main body by a magnetic force without using a mechanical bearing. The bearingless step motor comprises a stator including stator cores having winding portions and a rotor including a rotating shaft and rotor cores. The rotor rotates by a magnetic interaction between the rotor cores and the stator cores. A first permanent magnet is mounted to the rotor and a second permanent magnet is mounted to the stator. The first permanent magnet and the second permanent magnet are arranged so that a repulsive force is generated between magnetic poles. There is little power consumption for raising the rotating shaft and a complicated system for controlling the rise of the rotating shaft is unnecessary. Thus, the motor can be manufactured with a light and compact structure.

6 Claims, 2 Drawing Sheets

U.S. PATENT DOCUMENTS

| | | |
|---|---|---|
| 4,758,752 A | 7/1988 | Leenhouts |
| 4,963,775 A * | 10/1990 | Mori ..................... 310/49.32 |
| 5,159,219 A | 10/1992 | Chu |
| 5,506,459 A | 4/1996 | Ritts |
| 5,514,924 A * | 5/1996 | McMullen et al. ......... 310/90.5 |
| 5,585,680 A * | 12/1996 | Tsoffka ................... 310/49.32 |
| 5,587,617 A * | 12/1996 | Dunfield et al. ............ 310/90.5 |
| 6,255,749 B1 * | 7/2001 | Aoshima et al. ......... 310/49.05 |
| 6,262,508 B1 * | 7/2001 | Shibayama et al. ......... 310/181 |
| 6,359,349 B1 * | 3/2002 | Sakamoto ................ 310/49.33 |
| 6,710,489 B1 * | 3/2004 | Gabrys ..................... 310/90.5 |
| 7,078,839 B2 | 7/2006 | Kim |
| 2001/0030471 A1 * | 10/2001 | Kanebako .................... 310/12 |
| 2002/0084714 A1 * | 7/2002 | Fujita ......................... 310/181 |
| 2004/0066105 A1 | 4/2004 | Kim |

FOREIGN PATENT DOCUMENTS

| | | |
|---|---|---|
| JP | 08084454 A | 3/1996 |
| KR | 2002-0067863 | 8/2002 |

\* cited by examiner

BEARINGLESS STEP MOTOR

TECHNICAL FIELD

The present invention relates to a step motor having a stator and a rotor, which rotates when the stator is magnetized by a current applied thereto. More particularly, the present invention relates to a bearingless step motor in which a rotating shaft can rotate while rising from a main body by a magnetic force without using a mechanical bearing.

BACKGROUND ART

A conventional step motor is constructed so that a rotating shaft is supported radially by a conventional supporting element such as a ball bearing. Thus, the conventional step motor is often subjected to problems such as friction and wear, and is essentially equipped with a lubricating device. Accordingly, those skilled in the art have attempted to develop a bearingless step motor in which the rotating shaft can be supported non-frictionally by a magnetic force without using a mechanical bearing such that the operation of the rotating shaft can be controlled actively.

FIG. 4 schematically shows a conventional bearingless step motor, which is disclosed in Korean Patent Application Publication No. 2002-0067863. The conventional bearingless step motor depicted in such figure is capable of raising a rotating shaft without adding a coil for forming a magnetic bearing. The coils of electromagnets 3 of a stator 1 are disconnected from each other so that the electromagnets 3 are driven individually to thereby raise the rotating shaft by the magnetic forces of the electromagnets 3. The position of the rotating shaft is detected by a sensor. To compensate the position of the rotating shaft, the currents having different intensities should be applied to the respective electromagnets 3 according to the position of a rotor 2, thereby generating the magnetic forces having different intensities at the respective electromagnets 3.

However, the above prior art bearingless step motor is structurally complicated, operationally unreliable, power-consumptive and inappropriate to a compact system. This is because it includes multiple electromagnets for a magnetic rise of a rotor and is inevitably equipped with a controller having a complex structure, sensors and amplifiers for simultaneously controlling the rise and rotation of the rotor. The above prior art bearingless step motor is further disadvantageous since a control current must be supplied for the rise of the rotating shaft even when the rotating shaft is in a stationary (non-rotating) state.

DISCLOSURE

Technical Problem

The present invention provides a bearingless step motor designed for easy control, low power consumption, high operational efficiency, improved stability and advanced reliability.

Further, the present invention provides a bearingless step motor, which is formed in a simple and compact structure.

Technical Solution

In accordance with the invention as embodied broadly herein, there is provided a bearingless step motor, comprising: a stator including stator cores having winding portions; a rotor including a rotating shaft and rotor cores, the rotor being configured to rotate by a magnetic interaction between the rotor cores and the stator cores; a first permanent magnet mounted to the rotor; and a second permanent magnet mounted to the stator. The first permanent magnet and the second permanent magnet are arranged so that a repulsive force is generated between magnetic poles.

At least one of the first permanent magnet and the second permanent magnet is configured such that a width becomes narrower as it proceeds to a gap between the rotor and the stator.

The motor further comprises a thrust bearing element for rotatably supporting an end of the rotating shaft at the surface of a housing of the motor. In one embodiment, the thrust bearing element comprises a conic end of the rotating shaft and a concave surface formed at the housing. The conic end of the rotating shaft is in a point-contact with the concave surface. In another embodiment, the thrust bearing element is an electromagnetic coil mounted to a surface of the housing. When an electric current is applied to the electromagnetic coil, the rotating shaft moves away from the surface of the housing by a certain distance.

The coils of the winding portions located in a same phase may be connected to each other or disconnected from each other.

BEST MODE

The preferred embodiments of the present invention will now be described in detail with reference to the accompanying drawings.

Figure 1:
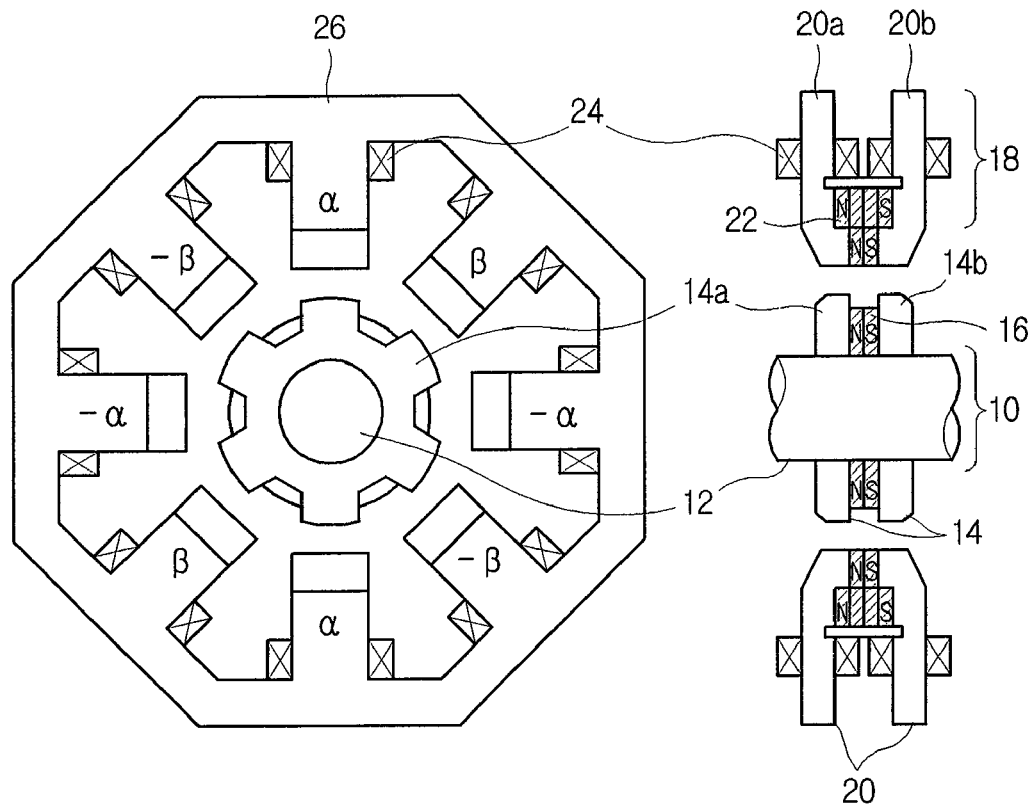
FIG. 1 is a constitutional view illustrating a bearingless step motor constructed in accordance with the present invention.

FIG. 1 is a constitutional view illustrating a bearingless step motor constructed in accordance with the present invention.

A bearingless step motor comprises a rotor 10, a stator 18 and a housing (not shown) accommodating the rotor 10 and the stator 18. The rotor 10 includes a rotating shaft 12, a first permanent magnet 16, a first rotor core 14a having multiple teeth (e.g., six teeth) and a second rotor core 14b having multiple teeth (e.g., six teeth). The first permanent magnet 16 is formed in a ring shape so as to surround the rotating shaft 12. The N-S poles of the first permanent magnet 16 are arranged in an axial direction of the rotating shaft 12. The first rotor core 14a and the second rotor core 14b surround the rotating shaft 12 and are positioned at the left and right sides of the first permanent magnet 16, respectively.

The stator 18 includes a yoke 26 provided in the housing, first stator cores 20a, second stator cores 20b, second permanent magnets 22 and winding portions 24. The first stator cores 20a are provided by eight, which are arranged equiangularly along the inner periphery of the yoke 26 and extend radially. The second stator cores 20b are provided by eight and positioned parallel and apart from the first stator cores 20a in the axial direction. Each second permanent magnet 22 is disposed between the first stator core 20a and the second stator core 20b. The N-S poles of the second permanent magnet 22 are arranged in the same direction of the N-S poles of the first permanent magnet 16. The winding portions 24 are provided at the first stator core 20a and the second stator core 20b.

By the structure described above, the annular first permanent magnet 16 provided around the rotor 10 opposes the eight second permanent magnets 22 such that the same polarities face each other to generate a repulsive force for causing the rotor 10 to rise stably in a radial direction.

As shown in FIG. 1, the second permanent magnet 22 may be formed in a stacking structure (e.g., two-story structure), where a part far from the rotor 10 has a width larger than the other part adjacent to the rotor 10. The second permanent magnet 22 may be also formed in a trapezoid shape such that the width becomes narrower as it proceeds toward the rotor 10. This minimizes a leakage flux flowing outward of the housing and concentrates the flux on the gap between the rotor 10 and the stator 18.

Figure 2:
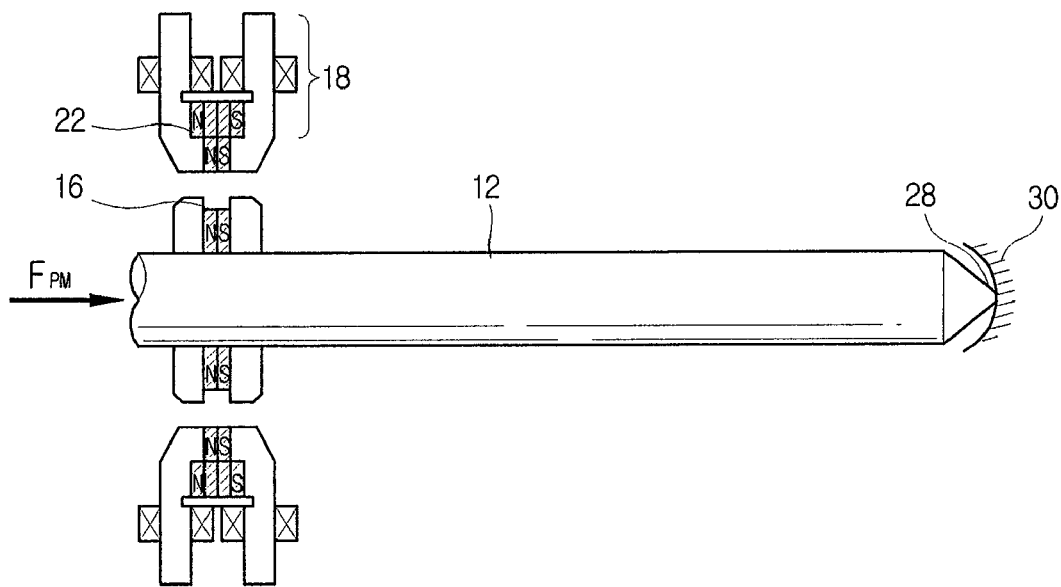
FIG. 2 is a schematic view illustrating a bearingless step motor according to one preferred embodiment of the present invention, which has a contact type shaft supporting structure.
Figure 3:
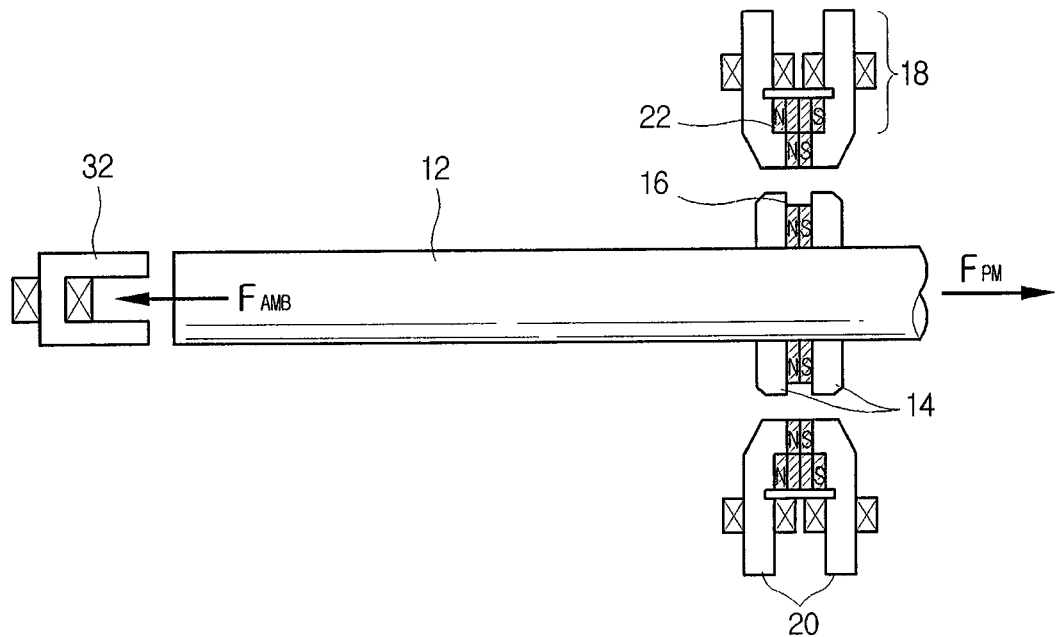
FIG. 3 is a schematic view illustrating a bearingless step motor according to another preferred embodiment of the present invention, which has a non-contact type shaft supporting structure.
Figure 4:
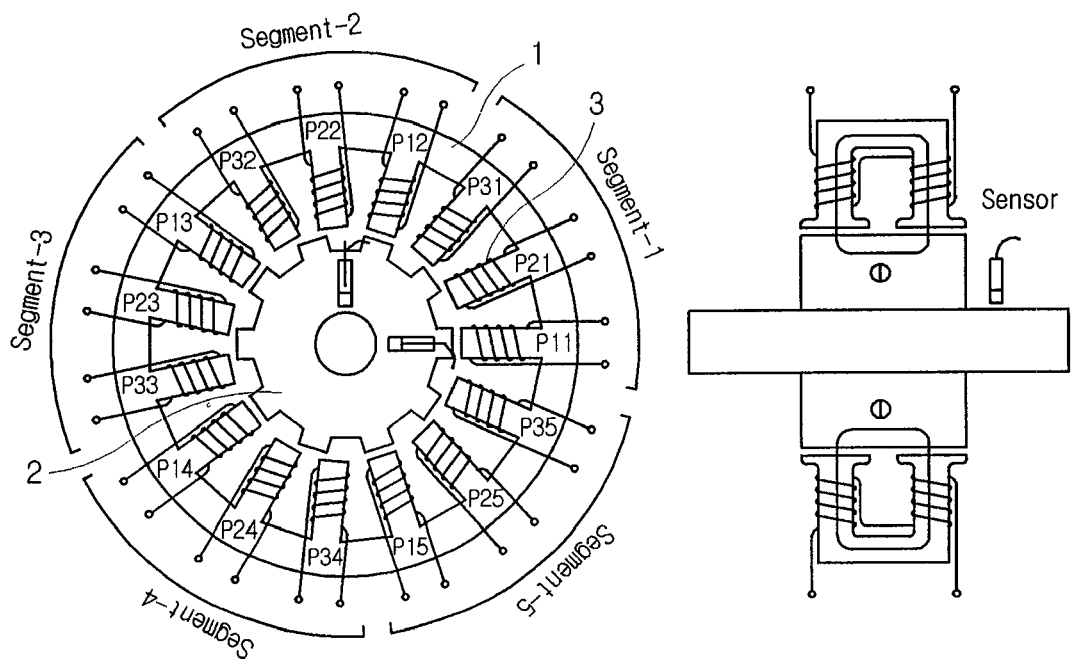
FIG. 4 is a cross-sectional view illustrating a bearingless step motor of the prior art.

Referring to FIGS. 2 and 3, to ensure that the magnetic force for the rise of the rotating shaft 12 exerts stably, a thrust bearing element is provided to support an axial magnetic force $F_{PM}$, which is generated when the first permanent magnet 16 provided around the rotating shaft 12 is displaced misalignedly with the second permanent magnet 22 provided at the stator 18.

FIG. 2 shows a bearingless step motor according to one preferred embodiment of the present invention, which has a contact type shaft supporting structure.

A front end 28 of the rotating shaft 12 is formed in a cone-shape and a concave surface 30 is formed at the housing. The conic front end 28 of the rotating shaft 12 is in a point-contact with the concave surface 30 of the housing. The conic front end 28 of the rotating shaft 12 and the concave surface 30 of the housing constitute the axial thrust bearing element.

FIG. 3 shows a bearingless step motor according to another preferred embodiment of the present invention, which has a non-contact type shaft supporting structure.

In this embodiment, the axial thrust bearing element is an active magnetic bearing 32 using an electromagnetic coil, which is mounted to a surface of the housing. When an electric current is applied to the electromagnetic coil, the rotating shaft 12 moves away from the surface of the housing by a certain distance.

Hereinafter, the operation of the bearingless step motor will be described with reference to FIGS. 1 to 3.

The rotating principle of the rotor of the bearingless step motor is similar to that of a conventional homopolar step motor. As shown in FIG. 1, the rotating shaft 12 is equipped with the rotor cores 14 having six teeth. When the coils of four electromagnets of the rotor cores, which are at a right angle to each other (two-"α" and two-"-α", or two-"β" and two-"-β" in FIG. 1), are set to have N, S, N and S polarities in order, the step motor is embodied in a 2-phase 4-pole motor. However, a homopolar flux is generated at a gap between the rotating shaft 12 and the stator 18 by the first permanent magnet 16 provided at the rotating shaft 12 and the second permanent magnet 22 provided at the stator 18. Thus, when the electric current is applied to the coils of the electromagnets of the rotor core so that a flux density formed by the electromagnets is smaller than the flux density formed by the permanent magnets, the polarity of each electromagnet is kept to be the polarity of the permanent magnet, which forms a homopolar step motor.

More specifically, when two teeth of the rotor core 14, which are located diametrically, oppose two electromagnets of α-phase, respectively, the electric current is applied to the electromagnets of β-phase and –β-phase. Then, a N-pole is formed at the winding portion of the first stator core 20a in the β-phase, which is in contact with the N-pole of the second permanent magnet 22. At the same time, a S-pole is formed at the winding portion of the second stator core 20b in the β-phase, which is in contact with the S-pole of the second permanent magnet 22. Thus, in the β-phase, the flux of the electromagnet is combined with the flux of the permanent magnet in the same pole-direction. As a result, the first stator core 20a in the β-phase has a relatively strong N-polarity and the second stator core 20b in the β-phase has a relatively strong S-polarity for an instant. On the contrary, a S-pole is formed at the winding portion of the first stator core 20a in the –β-phase, which is in contact with the N-pole of the second permanent magnet 22. A N-pole is formed at the winding portion of the second stator core 20b in the –β-phase, which is in contact with the S-pole of the second permanent magnet 22. Thus, in the –β-phase, the flux of the electromagnet is in the opposite pole-direction to the flux of the permanent magnet. As a result, the first stator core 20a in the –β-phase has a relatively weak N-polarity and the second stator core 20b in the –β-phase has a relatively weak S-polarity for an instant. At this time, the magnetic force in the β-phase, which pushes the teeth of the rotor core 14, is larger than the magnetic force in the –β-phase. Accordingly, the teeth of the rotor core 14 near the electromagnet in the β-phase are pushed away from the electromagnet in the β-phase. However, the teeth of the rotor core 14 near the electromagnet in the –β-phase are pulled to the electromagnet in the –β-phase. When an electric current is applied to the α-phase, the same result as described above is acquired. The strengths of the magnetic forces generated at the electromagnets in the same phases are equal. Therefore, the radial forces exerted to the six teeth of the rotor core 14 offset each other. However, the tangential forces rotate the rotating shaft clockwise by 15 degrees at a time.

By changing the number of the electromagnets mounted to the stator 18 and the number of teeth of the rotor core 14 mounted to the rotating shaft 12, the resolution of the rotating angle can be changed diversely. Further, a high precision motor can be manufactured.

The operation of the axial thrust bearing element will now be described.

When the first permanent magnet 16 mounted to the rotating shaft 12 is located misalignedly with the second permanent magnet 22 mounted to the stator 18 in order to stabilize the radial magnetic force, the axial magnetic force $F_{PM}$ is generated. As shown in FIG. 2, the axial magnetic force $F_{PM}$ is supported by the point-contact between the conic front end 28 of the rotating shaft 12 and the concave surface 30 of the housing.

In the embodiment shown in FIG. 3, the active magnetic bearing 32 is used as the thrust bearing element. In such a case, an additional system generates and controls an axial force $F_{AMB}$, which has the same strength as the axial magnetic force $F_{PM}$ and the opposite direction thereto. However, such an embodiment has a non-contact type structure for supporting the rotating shaft 12 in both radial and axial directions. Thus, there is no need of lubrication for reducing the friction and wear. Also, according to the axial displacement of the rotating shaft 12, there is a variation in the flux of the permanent magnets formed at the gap between the stator 18 and the rotor core 14 mounted to the rotating shaft 12. This influences the radial stiffness of the step motor so that a natural frequency of the motor changes. By controlling the intensity of the electric current applied to the active magnetic bearing 32 and adjusting the axial position of the rotating shaft 12, the natural frequency of the step motor is changed to prevent a resonance, which may occur when changing the motor speed.

The control process of the rotating shaft in a radial direction will now be described.

A passive bearingless step motor has a structural feature, wherein the coils of the winding portions 24 (see FIG. 1) in the same phases are connected to each other and the electromagnetic forces thereof are balanced in all directions so as not to generate a force for controlling the radial movement of the rotating shaft 12. If the coils of the winding portions 24 in the same phases are disconnected from each other and the electromagnetic forces thereof are asymmetric, then the radial movement of the rotating shaft 12 can be controlled. This is the feature of the active bearingless step motor. In other words, when a relatively large damping force is required for reducing the vibration, which may occur in a radial direction during the rotation of the shaft 12, and if the connecting structure of the coils of the winding portions is changed, then a damping operation can be performed by adjusting the intensity of the electric current without additional electromagnet. The winding portions 24 of four electromagnets, which are at a right angle to each other and set to have N, S, N and S polarities (e.g., the top α: N-pole, the right −α: S-pole, the bottom α: N-pole, the left −α: S-pole), are divided into two pairs of N-S poles (e.g., the pair of top α and right −α, and the pair of bottom α and left −α). Each pair of N-S poles is interconnected. Also, the electric currents having different intensities are applied to two pairs of the electromagnets, respectively. Then, the opposite forces exerted to six teeth of the rotor core 14 do not offset each other, and the force for controlling the radial movement of the rotating shaft 12 is generated. Such an active bearingless step motor increases the damping efficiency in comparison with the passive bearingless step motor. It has features of low power consumption and high stability and reliability in comparison with the conventional active bearingless step motor.

Although FIGS. 1 to 3 illustrate a bearingless step motor where the rotor is rotatably located inside the stator, it should be noted that the present invention is not restricted thereto. The bearingless step motor of the present invention may be embodied in another form in which the rotor is located around the stator and controlled by the process described above.

As described above in detail, the present invention has an advantage in that there is little power consumption for raising the rotating shaft and a complicated system for controlling the rise of the rotating shaft is unnecessary. Thus, the motor can be manufactured with a light and compact structure. Also, since there is no friction and wear of the components, the operational noise is eliminated, the lubricating system becomes unnecessary and the lives of the components are prolonged. Accordingly, the motor of the present invention is suitable for a system requiring a vacuum or super clean environment (e.g., artificial heart).

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes, which come within the equivalent meaning and range of the claims, are to be embraced within their scope.

The invention claimed is:

1. A bearingless step motor, comprising:
   a stator including stator cores having winding portions;
   a rotor including a rotating shaft and rotor cores, the rotor being configured to rotate by a magnetic interaction between the rotor cores and the stator cores;
   a first permanent magnet mounted to the rotor, the first permanent magnet being formed in a ring shape so as to surround the rotating shaft; and
   a plurality of second permanent magnets mounted to the stator;
   wherein N-S poles of the first permanent magnet are arranged in an axial direction of the rotating shaft and N-S poles of the second permanent magnets are arranged in the same direction of the N-S poles of the first permanent magnet such that the first permanent magnet and the second permanent magnets generate a repulsive force therebetween,
   wherein at least one of the first permanent magnet and the plurality of second permanent magnets is configured such that a width becomes narrower as it proceeds to a gap between the rotor and the stator.

2. The bearingless step motor of claim 1, wherein the motor further comprises a thrust bearing element for rotatably supporting an end of the rotating shaft at a surface of the motor.

3. The bearingless step motor of claim 2, wherein the thrust bearing element comprises a conic end of the rotating shaft and a concave surface of the motor, and wherein the conic end of the rotating shaft is in a point-contact with the concave surface.

4. The bearingless step motor of claim 2, wherein the thrust bearing element is an electromagnetic coil mounted to a surface of the motor, and wherein the rotating shaft moves away from the surface by a certain distance when an electric current is applied to the electromagnetic coil.

5. The bearingless step motor of one of claims 1 or 2-4 wherein coils of the winding portions located in a same phase are connected to each other.

6. The bearingless step motor of one of claims 1 or 2-4 wherein coils of the winding portions located in a same phase are disconnected from each other.

\* \* \* \* \*